United States Patent
Jenkins et al.

(10) Patent No.: US 6,373,951 B1
(45) Date of Patent: Apr. 16, 2002

(54) SYNCHRONIZATION TECHNIQUE AND METHOD AND APPARATUS FOR TRANSMITTING AND RECEIVING CODED SIGNALS

(75) Inventors: Keith E. Jenkins, Lincoln; Robert B. Basine, Waverly; LaRhue G. Friesen, Lincoln, all of NE (US)

(73) Assignee: Telex Communications, Inc., DE (US)

( * ) Notice: Subject to any disclaimer, the term of this patent is extended or adjusted under 35 U.S.C. 154(b) by 0 days.

(21) Appl. No.: 08/806,786

(22) Filed: Feb. 26, 1997

Related U.S. Application Data (60) Provisional application No. 60/012,465, filed on Feb. 28, 1996.

(51) Int. Cl.[7] .............................................. H04L 9/00
(52) U.S. Cl. ................................... 380/262; 380/265
(58) Field of Search ........................... 380/48, 50, 262, 380/265; 375/359, 360

(56) References Cited

U.S. PATENT DOCUMENTS

| | | | |
|---|---|---|---|
| 3,742,199 A | * 6/1973 | Lubarsky ..................... 341/95 |
| 4,170,714 A | * 10/1979 | Branscome et al. .......... 178/22 |
| 5,101,505 A | 3/1992 | Schiller et al. | |
| 5,530,959 A | * 6/1996 | Amrany ....................... 380/48 |
| 5,566,204 A | * 10/1996 | Kardontchik et al. ........ 375/219 |
| 5,600,682 A | * 2/1997 | Lee ............................. 375/354 |
| 5,613,005 A | * 3/1997 | Murakami et al. ............ 380/28 |
| 5,805,704 A | * 9/1998 | Hsu ............................. 380/48 |
| 5,818,940 A | * 10/1998 | Hovey et al. ................. 380/50 |

OTHER PUBLICATIONS

Horowitz & Hill The Art of Electronics pp. 525–527 1989.*
Memorandum from Bob DeLong to Keith Jenkins of Telex, dated Oct. 22, 1995; Subject: Self-Synchronized Scrambler.

* cited by examiner

*Primary Examiner*—Gail Hayes
*Assistant Examiner*—Douglas Meislahn
(74) *Attorney, Agent, or Firm*—Vincent L. Carney (57) ABSTRACT

To transmit encoded information such as for example voice messages between remote transceivers, a transmitter digitizes and encodes an audio signal and then transmits the resulting digital coded signal to the receiver. The receiver decodes the signal and converts it back to an audio signal. The received encoded digital signal is used to reset the timing clock in the receiver so that the timing is synchronized in the receiver and transmitter by the transmitted encoded information. The encoder transmits digital information to a shift register. Encoding switches select certain stages of the shift register and the transmitter transmits the exclusive-OR of the digitized message and the output of the selected stages. This signal is also the input to the shift register. The information transmitted to the receiver is a scrambled digital signal. In the receiver, the coded information synchronizes a clock for the shift register from the encoded digital signal that it receives and selects the stages of the shift register that unscramble the coded information for conversion to an audio signal suitable for the speaker.

24 Claims, 10 Drawing Sheets

SYNCHRONIZATION TECHNIQUE AND METHOD AND APPARATUS FOR TRANSMITTING AND RECEIVING CODED SIGNALS

RELATED CASES

This application is a continuation-in-part of U.S. application 60/012,465 filed Feb. 28, 1996, on Synchronization Technique and Method and Apparatus for Transmitting and Receiving Coded Signals.

COMPUTER PROGRAM LISTING APPENDIX

A Computer Program Listing Appendix on compact disc was submitted in this application. One compact disc and a duplicate copy were submitted containing the file "Patent.asm", which was created on Nov. 12, 2001, and is 68,827 bytes in size.

BACKGROUND OF THE INVENTION

This invention relates to synchronization of timing signals and to the transmission of encoded information such as for example the transmission of voice messages between remote transceivers in code.

It is known to transmit signals in digital code from one location to another for secrecy. However, most attempts to transmit digitized radio signals in encoded form in real time from one transceiver to another with reliable inexpensive equipment and good fidelity have been unsuccessful. This has been difficult to achieve with a coded signal because of the difficulty in synchronizing the encoding and decoding circuits in the transmitting and receiving apparatuses in real time with reasonable precision.

SUMMARY OF THE INVENTION

Accordingly, it is an object of the invention to provide a novel technique for synchronizing timing circuits not having a connection between them such as for example not having an electrical connection between them.

It is a further object of the invention to provide an electromagnetic linkage in which a signal is encoded and transmitted at one location and received and decoded at the other location without the use of a solid connection therebetween.

It is a further object of the invention to provide a novel radio for transmitting and receiving encoded signals.

It is a still further object of the invention to provide a novel portable transceiver capable of transmitting and/or receiving signals in encoded form from another source.

In accordance with the above and further objects of the invention, remotely located timing circuits such as oscillators operating at the same frequency are synchronized together from the signals that are transmitted fron one unit to the other. The signals, upon being received by the second unit, are used to synchronize the timing circuit in the second unit to that in the first unit to permit decoding of the data.

In the preferred embodiment, a transmitter digitizes and encodes an audio signal and then transmits the resulting digital coded signal to the receiver. The receiver decodes the signal and converts it back to an audio signal. The received encoded digital signal is used to reset the timing clock in the receiver so that the timing is synchronized in the receiver and transmitter by the transmitted encoded information. The synchronized signals are used in the encoding and decoding of the signal.

In one embodiment, the encoder feeds digital information to a shift register. Encoding switches select certain stages of the shift register and the transmitter transmits the exclusive OR of the digitized message at the output of the selected stages. This signal is also an input to the shift register. Thus, the information transmitted to the receiver is a scrambled digital signal. In the receiver, a shift register has the same stages selected as in the transmitter and the coded information synchronizes a clock for the shift register from the encoded digital signal that it receives. The selected stages of the shift register unscramble the coded information for conversion to an audio signal suitable for the speaker.

In the preferred embodiment, the transmitter converts the analog audio signal to a digital binary signal with 16 bit words. It counts the binary ones in each 16 bit word, and if the number of ones is an odd number, it inverts the digital word before transmitting with the entire encoded message. It transmits words having an even number of binary ones without inverting them. At the receiver, the words having an odd number of ones (or of zeros) is reinverted and the words are decoded using the same process as the coding.

Of course, other characteristics that can be determined from the transmitted word may be used to alter the digital code in a predictable manner. For example, if the coded words include an odd number of bits such as 17 bits but a binary one is always added at a fixed position before transmitting and always subtracted upon receiving, the bit in the fixed position would be ignored and the process repeated or an even number of bits per word could be used but binary zeros could be counted and the word invested if an even number of binary zeros are in the word as described above.

From the above description, it can be understood that the synchronizing technique of this invention and the coded transmission system of this invention have several advantages such as: (1) they provide low noise transmission; (2) there is very little cross talk between several different transmitters even when the encoding selections are only slightly different; (3) the equipment is simple and inexpensive; and (4) the code may be easily changed.

SUMMARY OF THE DRAWINGS

The above-noted and other features of the invention will be better understood from the following detailed description when considered with reference to the accompanying drawings, in which.

DETAILED DESCRIPTION

Figure 1:
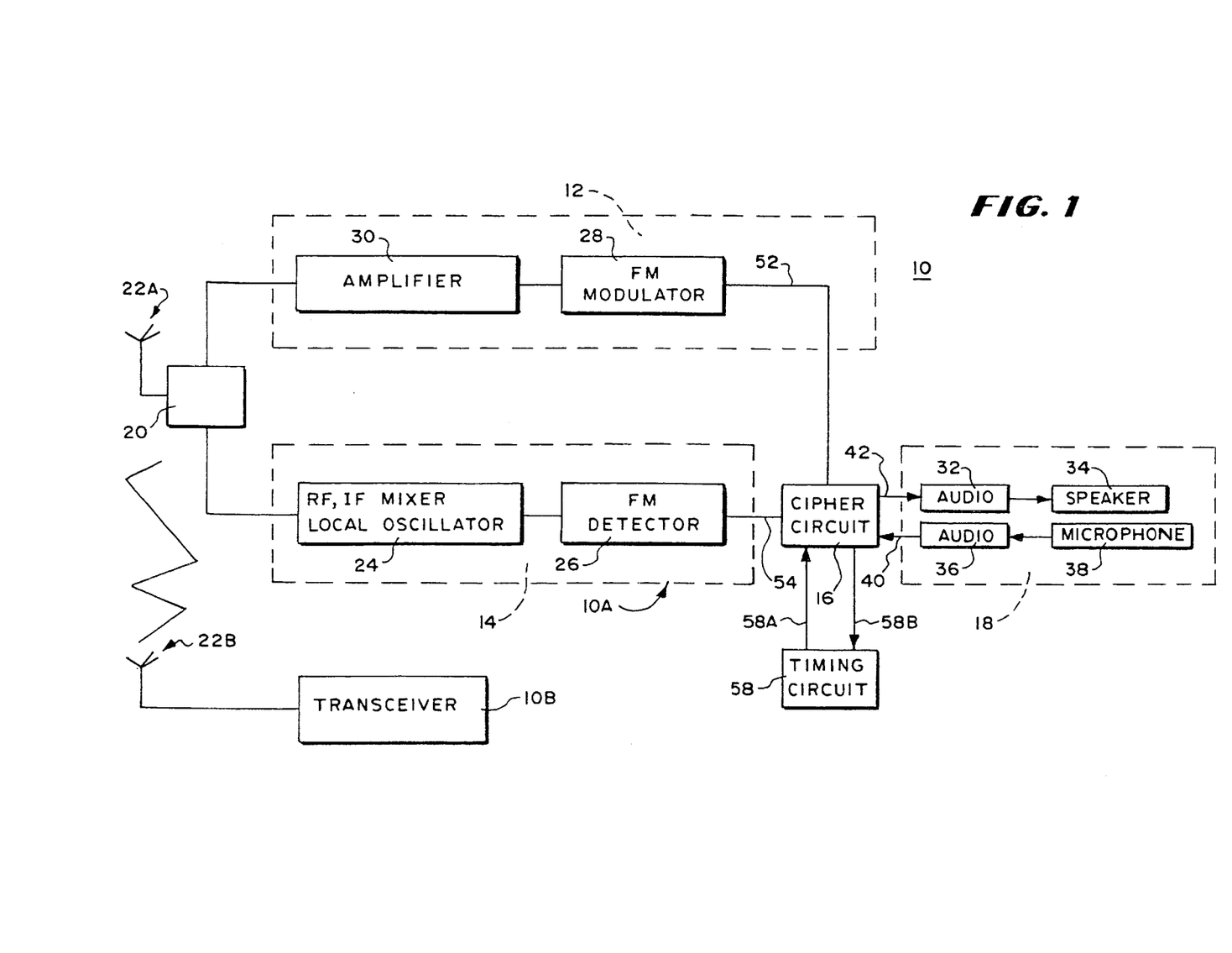
FIG. 1 is a block diagram of a radio system in accordance with an embodiment of the invention.

In FIG. 1, there is shown a duplex radio system 10 having a first transceiver 10A and a second transceiver 10B. In the preferred embodiment there are a multiplicity of transceivers and one of the transceivers serves as a base station. Each of the trasceivers has a convenient system for selecting a code in which the signals are encoded for transmission between the transceivers. One purpose of the encoding and decoding is to provide a ciphered message but the claimed system also provides the advantages of high fidelity and low cross talk with a simple inexpensive circuit.

In this cryptic radio system, a simple selection device is used to select any of many different codes as long as both the transmitter and the receiver that send and receive the scrambled signals are set to the same code, the transmission occurs with good fidelity and little cross-talk with other transceivers that may be in the same region. For the purposes of this description, the transceiver 10A and the transceiver 10B are substantially identical and only the transceiver 10A will be described hereinafter.

The transceiver 10A includes a first antenna 22A for the transmitter, a second antenna 23A for the receiver, a circuit 20 for connecting the antenna 22A to transmit signals, a circuit 21 for connecting the antenna 23A to receive signals for the transceiver 10A, a transmitting circuit 12, a receiving circuit 14 a cipher circuit 16, an audio circuit 18 and a timing circuit 58. The audio circuit 18, the transmitting and receiving circuits 12 and 14, the circuits 20, 21 and the antennas 22A and 23A are all conventional and not part of the invention except to the extent that they cooperate with the cipher circuit 16.

The receiving circuit 14 includes conventional units such as the RF stage, IF stage, mixer and local oscillator indicated at 24 and the FM detector indicated at 26. The transmitting circuit 12 includes conventional FM modulation circuits such as those indicated at 28 and amplification circuits such as those indicated at 30. With this circuitry, digital encoded signals are received and applied from the FM detector 26 to the cipher circuit 16 and audio signals are provided to the cipher circuit 16 and provided by the cipher circuit 16 to the transmitter circuit 12 for transmission. The cipher circuit 16 is also connected to the audio circuits 18 which include audio stages 32 and 36, the speaker 34 and the microphone 38. The audio stage 32 receives signals from the cipher circuit 16 and applies audio signals to the speaker 34 for providing sound to the operator. The audio stage 36 receives signals from the microphone 38 and provide signals to the cipher circuit 16 for transmission.

The timing circuit 58 is connected to the cipher circuit 16 through conductors 58A to provide timing signals to the cipher circuit 16 and through the conductor 58B to transmit data from the cipher circuit 16 to the timing circuit 58 for synchronization of the timing circuit 58 when it is serving as a slave transceiver to a master trasceiver as far as synchronization is concerned. Most commonly, at least one of the speakers is in headphones.

Figure 2:
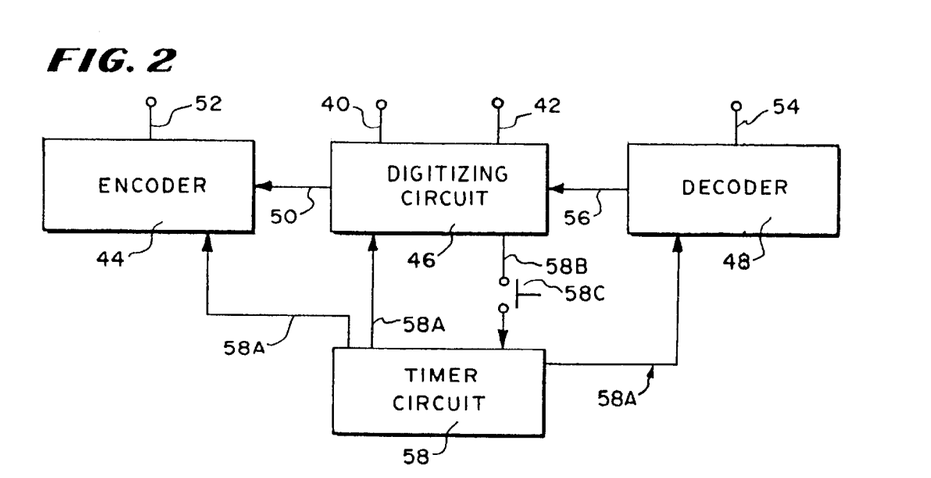
FIG. 2 is a block diagram of a cipher circuit used in the radio system of FIG. 1.

In FIG. 2 there is shown a block diagram of the cipher circuit 16 including an audio input conductor 40, an audio output conductor 42, an encoder 44, a digitizing circuit 46, a decoder 48, a data output conductor 50 from the digitizing circuit 46 to the encoder 44, a data output conductor 52 from the encoder 44 to the transmitter circuit 12 (FIG. 1) a data input conductor 54 to the decoder 48, a data input conductor 56 from the decoder 48 to the digitizing circuit 46 and a timer circuit 58.

The timer circuit 58 is connected to each of the synchronized circuits of the cipher circuit 16 to provide timing signals through a conductor 58A to the encoder 44, the digitizing circuit 46 and the encoder 48. The conductor 58B for transmitting data to the timer circuit 58 has incorporated within it a switch 58C. If the switch 58C is open, the transceiver 10A is the master transceiver and the transmitted data from this master transceiver 10A is used to synchronize the timing circuit in the other transceiver (slave transceiver 10B). If the switch is closed, then transceiver 10A is a slave transceiver and data transmitted from the master transceiver 10B is used to synchronize the timing circuit 58 in this slave transceiver 10A.

Figure 3:
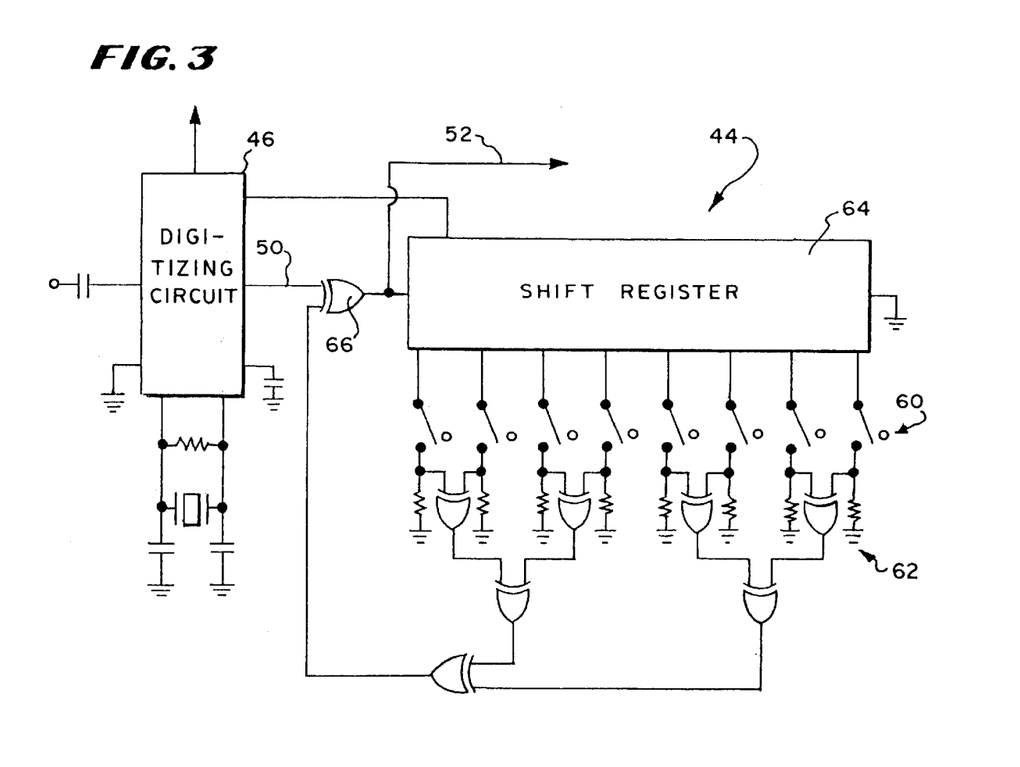
FIG. 3 is a schematic diagram of an encoder used in the cipher circuit of FIG. 2.

In FIG. 3 there is shown a schematic circuit diagram of the encoder circuit 44 and digitizing circuit 46 connected to each other. The encoder 44 includes a 16-bit shift register 64, selector switches 60, and a decoding circuit 62. The selector switches 60 are connected between the outputs of the shift register 64 and the decoding circuit 62 to permit the selecting of a code. The shift register 64 is connected to one input of an exclusive OR gate 66, the other input being connected to the output of the digitizing circuit 46 which provides coded signals to this input of the exclusive OR gate 66 through the conductor 50. The output of the exclusive OR gate 66 is transmitted to the transmitter through the conductor 52.

The selector switch bank 60 and the gating circuit 62 of the transmitter enable the stages of the shift register 64 that are selected for transmission. These stages correspond to the stages enabled in a corresponding shift register, selection switches and gating circuit in the decoder 44 of a receiver that receives the signal. The selector switches connect the signals through exclusive OR gates in the gating circuit 62 so that only the bits of the signal in certain stages of the shift register are transmitted to the output conductor 52 for transmission at each clock pulse.

Figure 4:
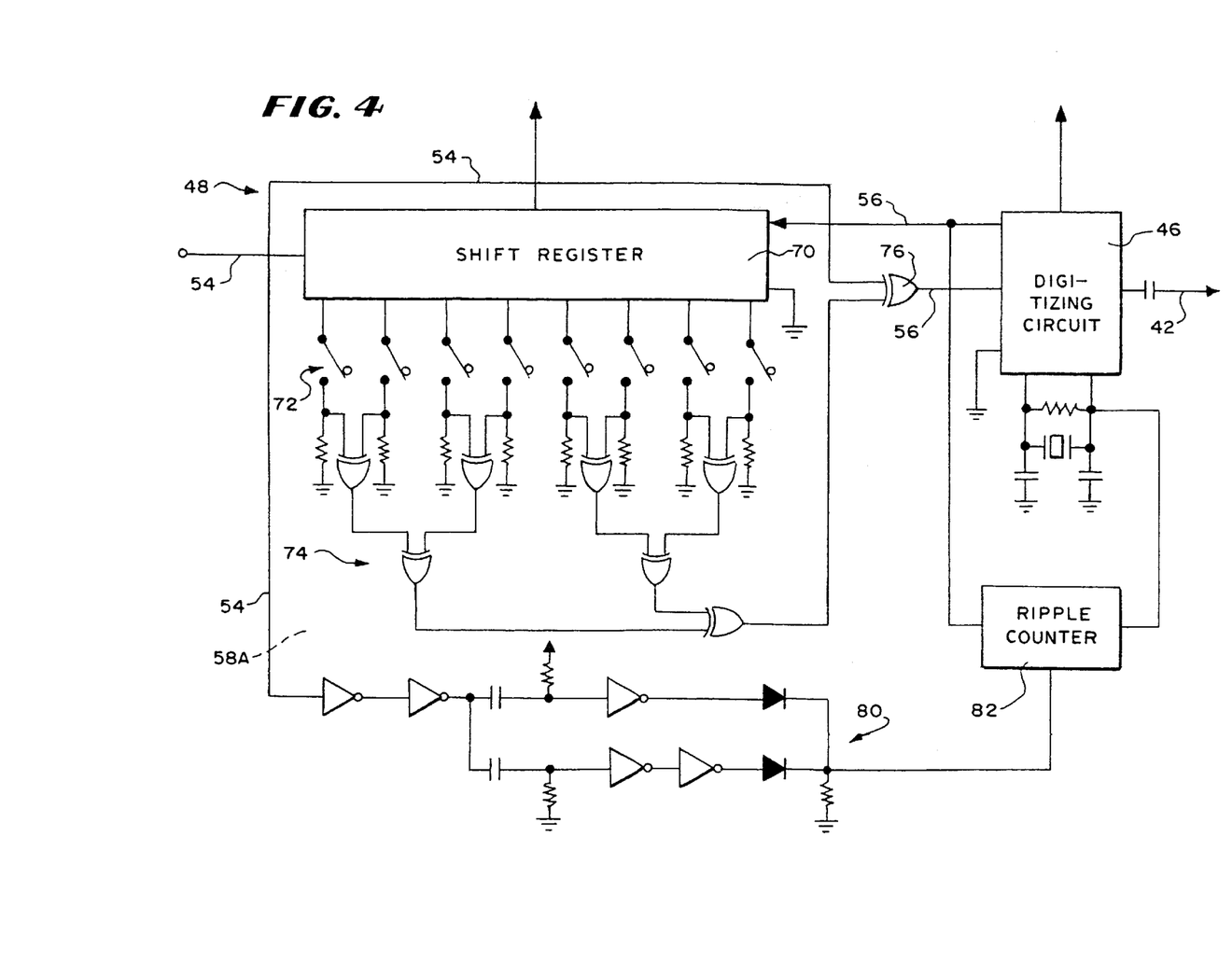
FIG. 4 is a schematic circuit diagram of a decoder used in the cipher circuit of FIG. 2.

In FIG. 4, there is shown a schematic circuit diagram of the decoder 48 connected to the digitizing circuit 46 and of the timing circuit 58. The decoder 48 includes a bank of shift registers 70, selection switches 72 and an exclusive OR gate 76. The shift registers 70, selection switches 72 and gating circuit 74 correspond to the shift register 64, selection switches 60 and gates 62 of the encoder 44 (FIG. 3) respectively. The selection switches 72 are selected to correspond to the selection switches 60 so that if one transceiver is intended to transmit signals to a second transceiver, the same numbered switches are closed such as the first switch, the second switch and the fifth switch in both to provide proper decoding of the encoded digital signal.

The timing circuit 58A includes a differentiator 80 and a ripple counter 82 connected together to provide edge signals at the selected frequency. The differentiator 80 forms the edge signal and the ripple counter 82, driven by the oscillator in the digitizer 46 divides the frequency to the chosen frequency.

With this arrangement, signals received from the FM modulator 28 of the decoder through conductor 54 are transmitted to the shift register 70 and to the timing circuit 54, then selected in the shift register 70 by the selection switches 72 for application to the gating circuit 74 which transmits them to the exclusive OR gate 76. Timing signals and data signals are also supplied to the timing circuit 58A which detects the positive and negative transitions of the data by the two differentiators at 80 and transmits them to the ripple counter 82. An oscillator within the digitizing circuit 46 in some embodiments performs the synchronization. It drives the ripple counter 82. A microprocesser 90 receives the signal from CODEC 94 and transmits an audio signal to the speaker.

Figure 5:
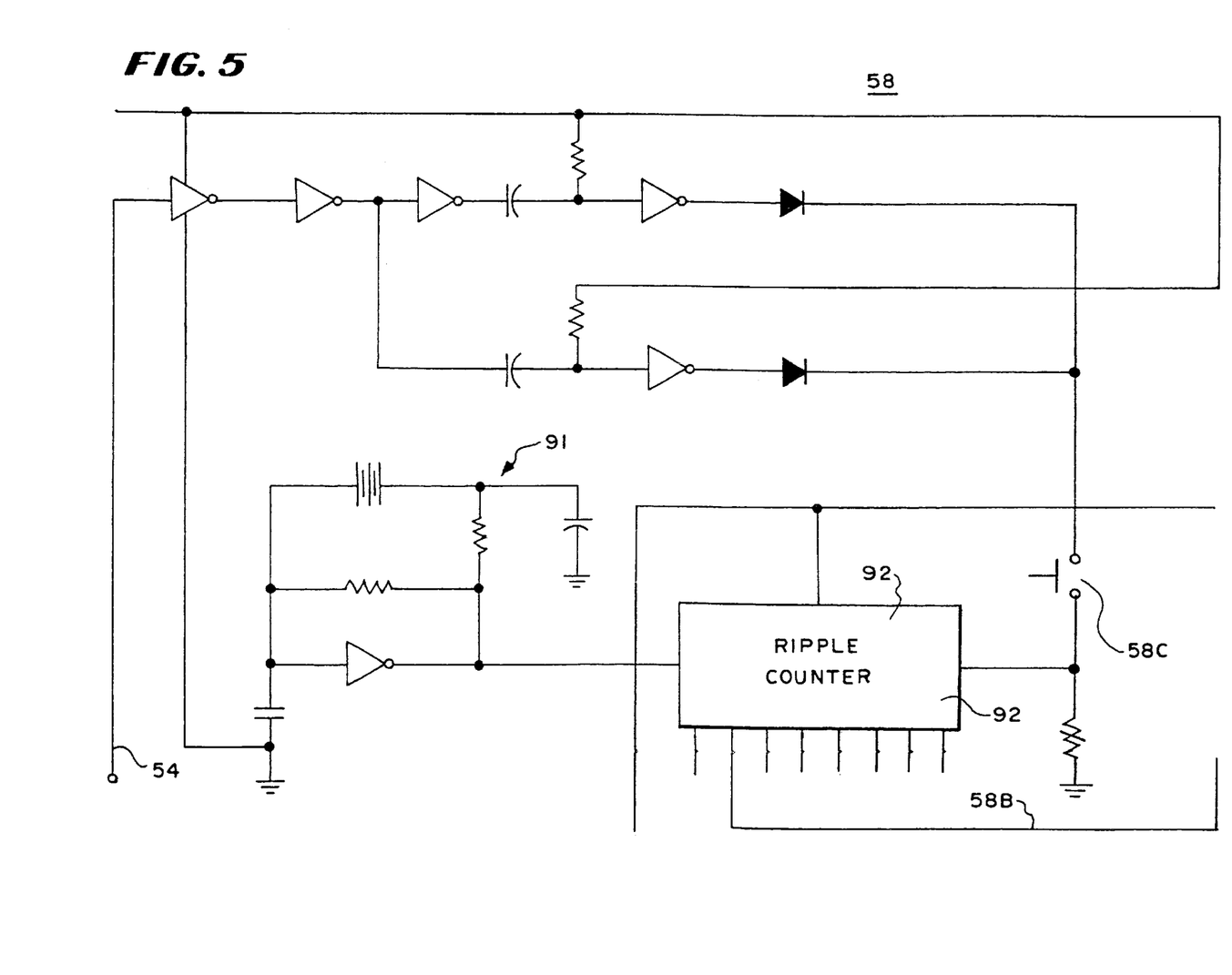
FIG. 5 is a schematic circuit diagram of a synchronizing circuit for use in the cipher circuit.

In FIG. 5, there is shown a schematic circuit diagram of the timing circuit 58 which is driven by a crystal oscillator 91 through a ripple counter 92 with a tap taken off of it to apply to the circuits being timed through conductor 58B. The switch 58C is used to select the slave transceiver for that operation since the data signal applied through conductor 54 is transmitted through switch 58C when closed to reset the counter 92 in synchronization with input data. The digitizing circuit 46 is a 609 delta modulation circuit sold by MX-COM, Inc. The shift registers 64 and 70 are 4015 B shift registers manufactured by SGC-Thomson Microelectronics, the ripple binary counter 92 is a SGS-Thomson HCC 4020 ripple-carry binary counter-divider, the exclusive OR gates are 4030 exclusive OR gates and the AND gates are 4073 AND gates.

Figure 6:
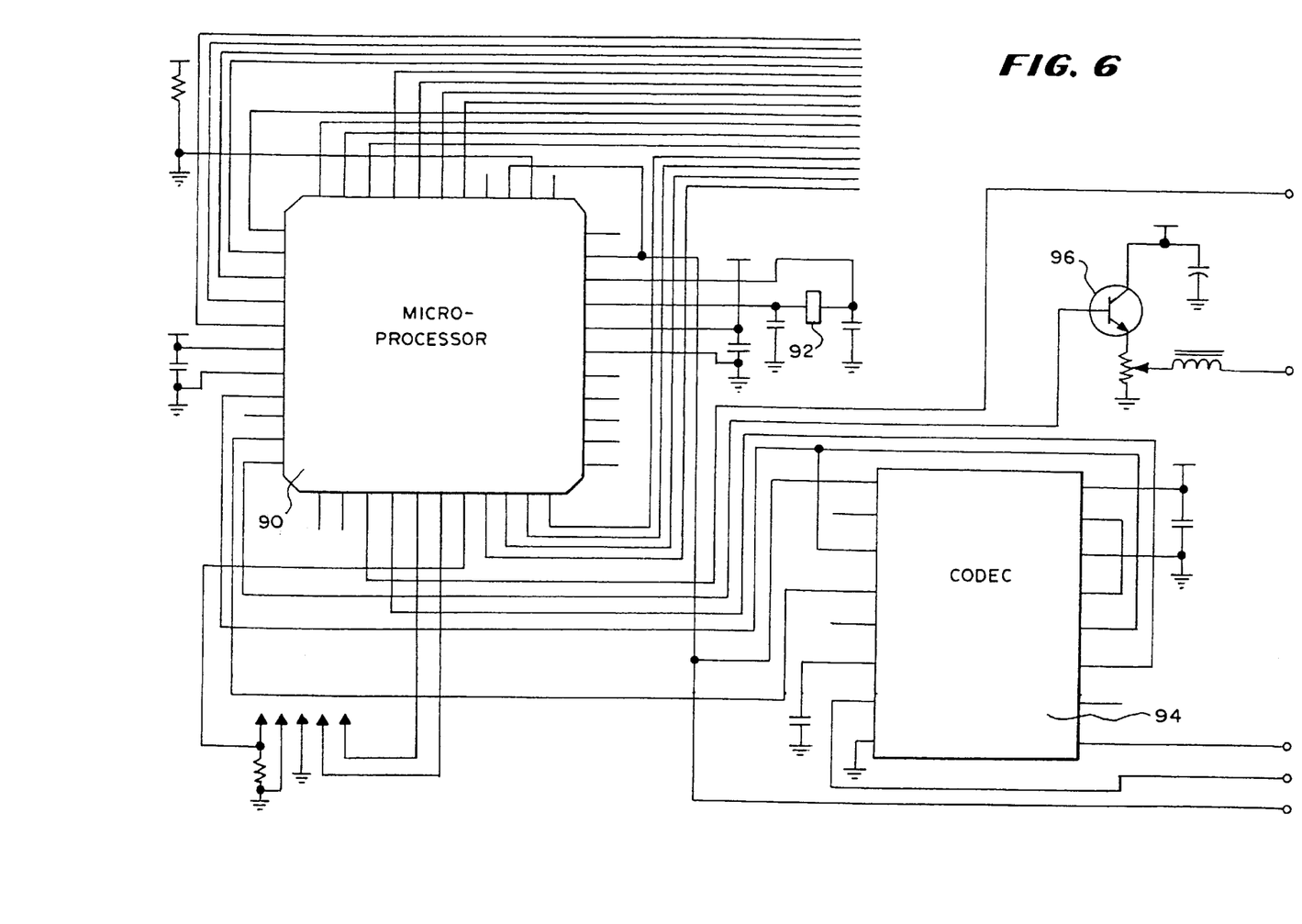
FIG. 6 is a schematic circuit diagram of another embodiment of cipher circuit using a microprocessor.

In FIG. 6, there is shown a block diagram of another embodiment of the invention having a microprocesser 90, an oscillator 92, a CODEC 94 and an amplifier 96. The microprocesser 90 is programmed with the software contained in the Computer Program Listing Appendix on compact disc to perform the steps of encoding and decoding. The CODEC 94 receives analog information from the microphone, converts it to digital information and feeds the digital signal to the microprocesser or receives decoded digital signals from the microprocesser, converts it to an analog signal and transmits it to the speaker. The microprocesser performs encoding and decoding functions by receiving the digital signal, and in accordance with its software, feeding it at the selected clock rate through a software shift register, selecting certain stages for a scrambled output for transmitting to the receiver or receiving coded digital signals to process in the shift register and to the CODEC. When receiving the encoded digital signal, the CODEC performs the inverse function to provide an analog signal to the speaker. The CODEC 94 serves its design function as a receiver or transmitter.

Figure 7:
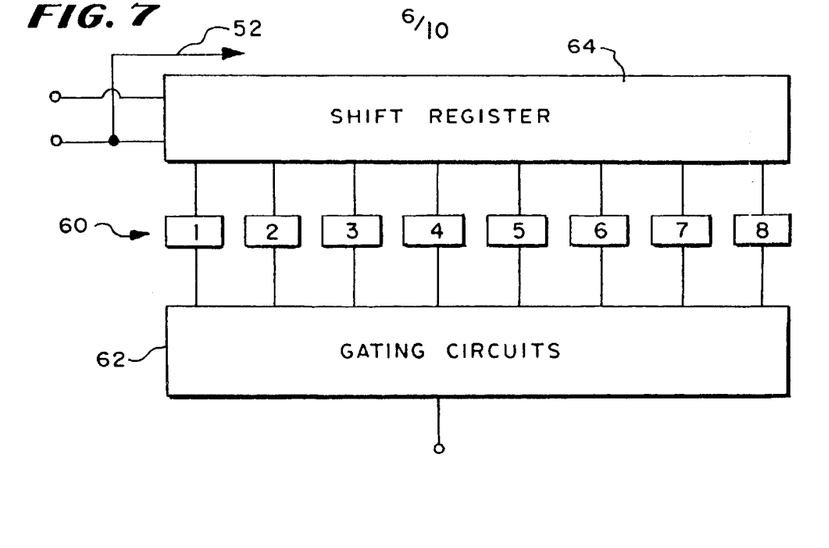
FIG. 7 is a simplified schematic diagram showing one embodiment of encoding and decoding keys.

In FIG. 7, there is shown the eight stages of switches 60, each of which enables the selection of outputs from the hardware shift register 64 in the embodiment of FIG. 3 or its software equivalent in the embodiment of FIG. 6 in accordance with a number on a particular switch. Thus, the selection of the fifth wheel for turning, connects the fifth stage of the hardware or software shift register to the exlusive OR circuits 62. By setting the same combination of switches on or off in a receiver and a transmitter of the embodiments of FIGS. 4 and 6, the encoder and decoder match to provide communication with little cross-talk even with transceivers operating at a similar frequency and with similar codes.

In summary, the encoder 44 includes: (1) an analog-to-digital converter; (2) an exclusive OR gate; (3) a shift register with a certain number of stages; (4) a set of the same number of switches; and (5) a network which obtains the single bit result of the exclusive or of the inputs. The analog-to-digital converter used in this application is a continuously variable slope delta modulator 46 that converts the incoming analog signal into an asynchronous data stream.

One input of the gate receives the data and the other is a control signal. This gate passes the data through unaffected if the control input is a logic low. If the control input is a logic high, the data is inverted. The output of this gate represents the data transmitted to the decoder.

The transmitted data also flows in a shift register of a fixed number of stages. The shift register contains the memory of a corresponding number of last bits of data that were transmitted. The outputs of this shift register stages are connected through corresponding switches giving a number of possible combinations of switch settings. An exclusive OR network having the same number of inputs and one output is connected to the switches so that the exclusive OR of the outputs of the selected stages may be found. The single bit result is used as a control input of the previously described exclusive OR gate located in the path of the data stream.

The decoder consists of: (1) a shift register of the same number of stages as the shift register in the encoder; (2) a set of code switches of the same number; (3) a network which obtains a single bit result of the exclusive OR of the inputs; (4) an exclusive OR gate; (5) a digital-to-analog converter; and (6) a synchronizer. The data stream entering the decoder flows into a shift register. This shift register then contains the same information as the shift register which is located in the encoder. The outputs of the shift register stages are connected to switches. These switches are then connected to an exclusive OR network identical to the one previously described for the encoder.

The single bit input of the above network is exclusive OR gated with the incoming data stream. Assuming the decoder settings are identical to the encoder switch settings the following occurs: the bits which, at the encoder, were not inverted, are not inverted here at the decoder. In a similar fashion, those bits which, at the encoder were inverted, are now inverted again restoring them to their original state. The resulting decoded data is fed to a continuously variable sloped delta digital-to-analog converter 46. The output of this decoder represents the recovery of the analog signal which was applied to the encoder.

Both encoder and decoder clocks are obtained by dividing the output of a crystal oscillator using a ripple counter. As the crystal oscillators are not tied to one another, the encoder and decoder clocks drift past one another in phase, causing a loss of the recovered analog signal with each cycle. To prevent this, a synchronizing circuit is used in the decoder. Each transition of the incoming data stream, regardless of direction, is used to generate a short pulse which is then used to reset the ripple counter. This forces the decoder clock to match in the inverse of the encoder clock at the data transition points and the crystal oscillator maintains the clock between transitions. An inverse clock is used to allow the incoming data to settle before being clocked.

This process converts the analog audio signal to a digital binary signal in the CODEC94 with 16 bit words. It counts the binary ones in each 16 bit word in the microprocesser 90, and if the number of ones is an odd number, it inverts the digital word before transmitting with the entire encoded message. It transmits words having an even number of binary ones without inverting them. At the receiver, the words having an odd number of ones (or of zeros) is reinverted and the words are decoded using the same process as the coding.

Of course, other characteristics that can be determined from the transmitted word may be used to alter the digital code in a predictable manner. For example, if the coded words include an odd number of bits such as 17 bits but a binary one is always added at a fixed position before transmitting and always substracted upon receiving, the bit in the fixed position could be ignored and the process repeated or an even number of bits per word could be used but binary zeros could be counted and the word inverted if an even number of binary zeros are in the word as described above.

Figure 8:
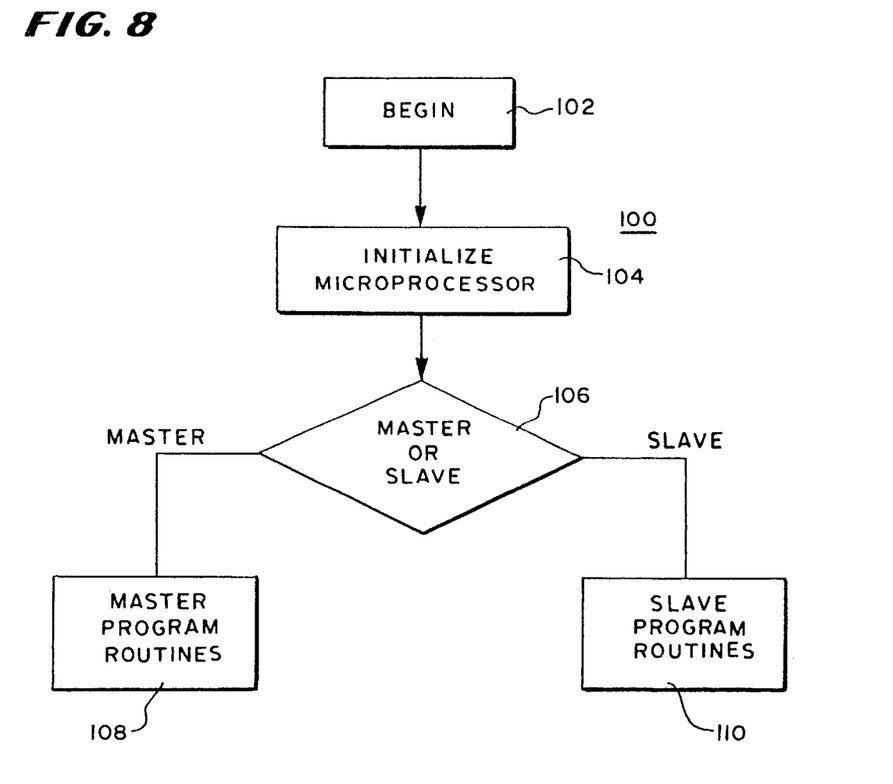
FIG. 8 is a block diagram showing a manner in which the circuit of FIG. 6 implements the invention.

In FIG. 8, there is shown a block diagram 100 illustrating the steps of beginning 102 to begin transmission with a switch and followed by talking into a microphone for real time encoding and transmission. The mircoprocesser is initialized as shown at step 104 and the program determines if the transceiver being spoken into is to be the master or the slave program indicated at step 106. If it is to be the master transceiver, then the program proceeds to the master program routines 108 and if it is to be the slave transceiver the program proceeds to the slave program routines 110.

Figure 9:
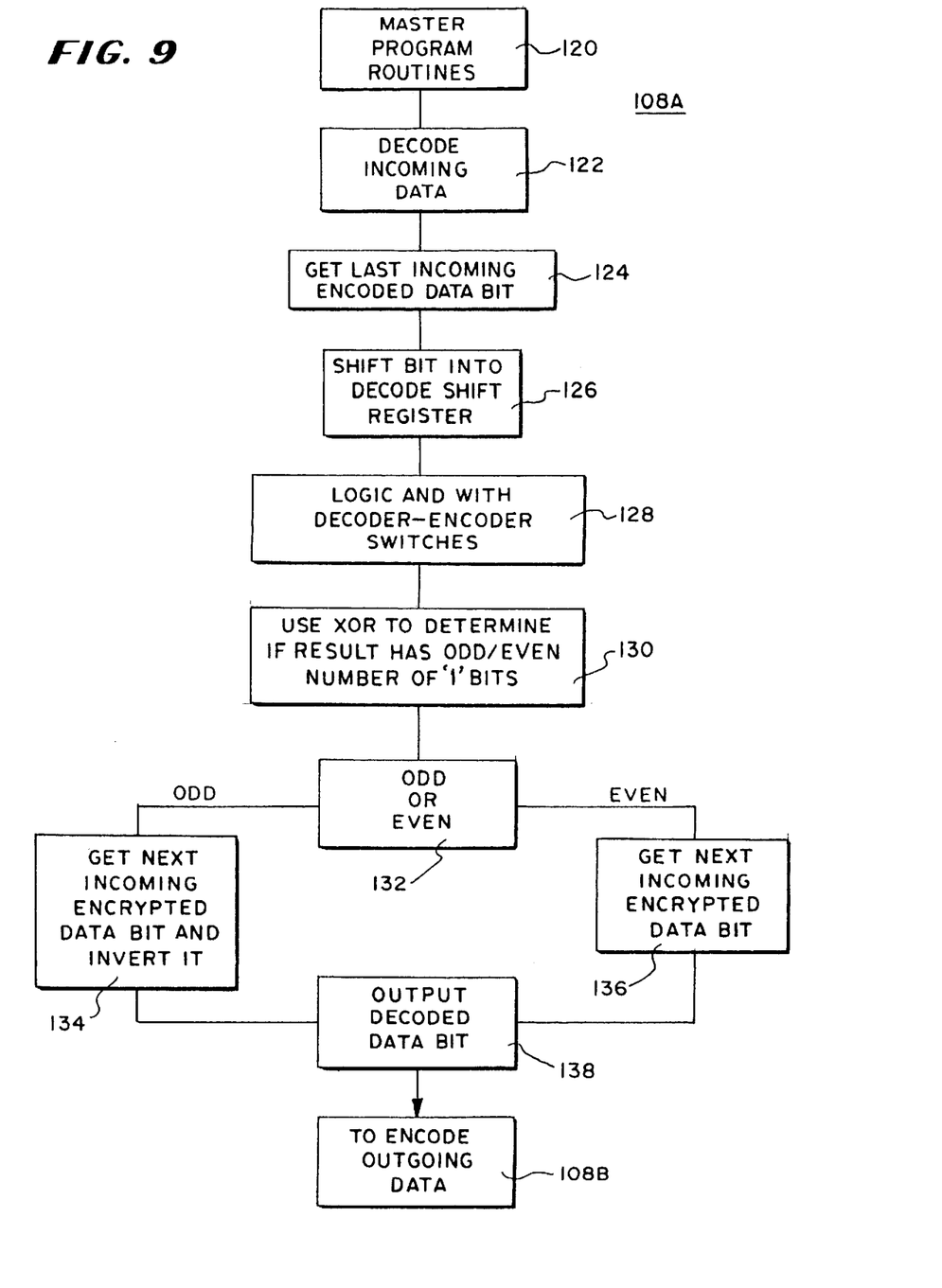
FIG. 9 is a more detailed block diagram of a portion of the embodiment of FIG. 8.

In FIG. 9, there is shown a flow diagram of the program for receiving signals for the master transceiver including the steps of selecting the master program routines shown at step 120, and decoding the incoming data shown at step 122. In the decoding process, the last incoming encoded data bit is selected as shown in step 124 and shifted into the decode software shift register shown at step 126.

The selected stages of the shift register are set by the manual switches shown in FIG. 7 and the bits are selected as they move through the software shift register as shown at 128 and exclusively-ORed to determine if the result has odd or even number of binary one bits shown at step 130. If the decision shown as being made in steps 132 indicates an odd number of bits, then the next incoming encrypted data bit is inverted as shown at step 134. If it is even, then the next incoming encrypted data bit is selected as shown at step 136 without inverting. The steps 134 and 136 are followed by the output data bit shown at 138. This code may then be converted to the analog audio output signal. Outgoing data is encoded as shown at step 108B and more specifically in FIG. 10.

Figure 10:
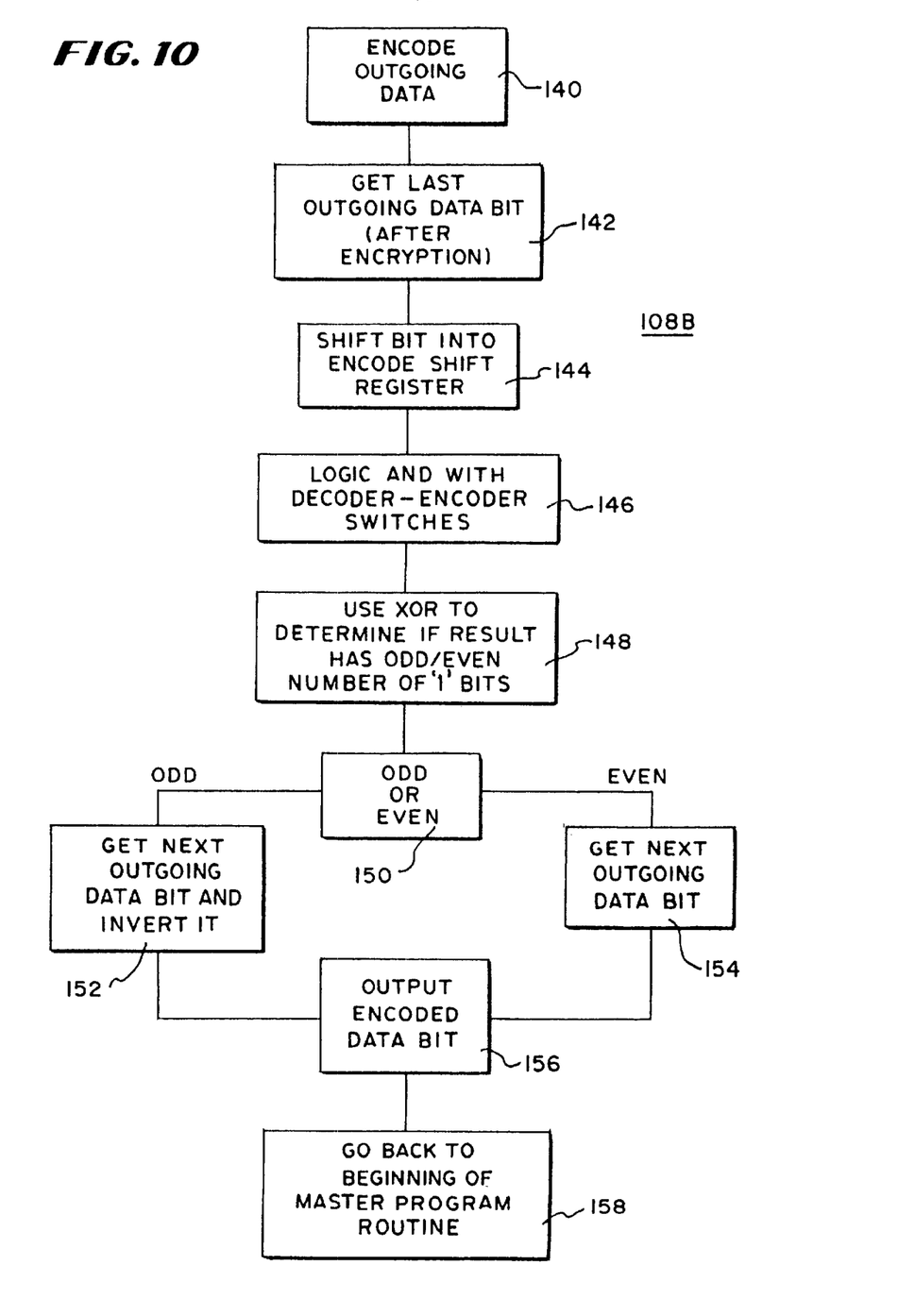
FIG. 10 is a more detailed block diagram of another portion of the embodiment of FIG. 8.

As shown in FIG. 10, when an audio signal in analog form is generated by speaking into the microphone of the transmitter, the signal is digitized and encoded as shown at step 140. The last outgoing data bit after encryption is selected as shown at step 142 and shifted into the encode shift register as shown at step 144. The shift register has been set by the switches shown in FIG. 7 to the established code and this code is processed in the soft shift register as shown in step 146 to cause the selected stages to be exclusively-ORed to determine if the result has an odd or an even number of binary one bits as shown at step 148. If a decision is made as shown at step 150 that the result has an odd number of bits, then the program proceeds to step 152 to invert the bit. If it has an even number as shown at step 154, then the bits are transmitted on without inverting. The output encoded data bit is shown at 156 ready for transmission to the receiver. The program then returns to its beginning routine as shown at step 158.

Figure 11:
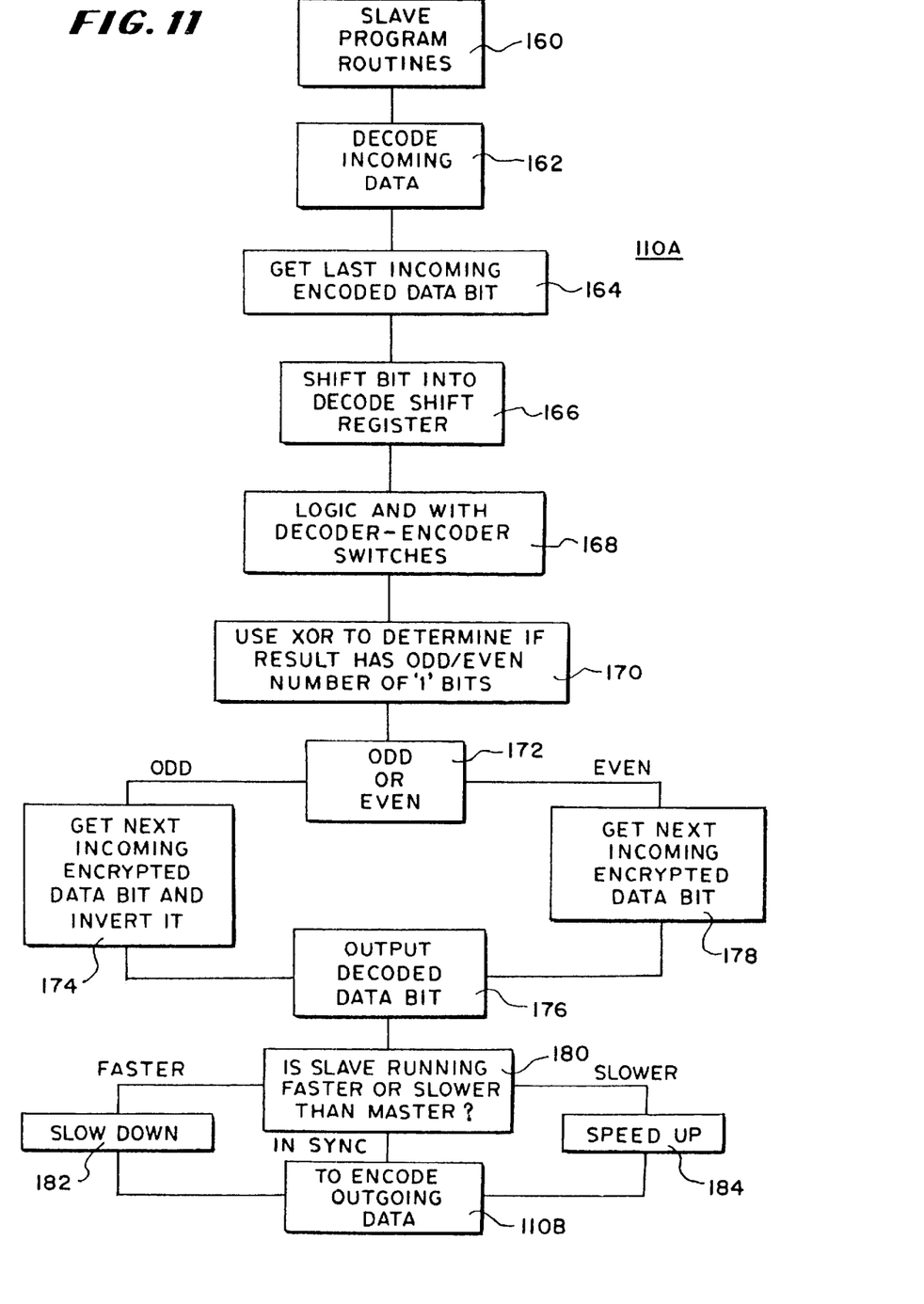
FIG. 11 is a more detailed block diagram of another portion of the embodiment of FIG. 8.

In the case the switch has been pushed so that the transceiver is a slave transceiver rather than the master transceiver the program as shown at 110A starts with the slave program routines being selected as shown by the step 160. Incoming data after this selection is decoded as shown at step 162 by getting the last incoming encoded data bit as shown in step 164 and shifted into a software register shown at step 166. The switches have already been manually selected so that the program implements the selection of the bits in the shift register as the shift register is stepped from stage to stage in accordance with the code as shown at step 168. These bits are exclusively-ORed to determine if the result has an odd or even number of binary one bits as shown at step 170.

A decision is made as shown at step 172 and if there are an odd number of binary one bits, the bits are each inverted as shown at step 174 and transmitted on to the output decoded data bit program shown at step 176. On the other hand if they are an even number of bits, the data bits are shifted to the output decoded data bit program 176 without inverting as shown in step 178. The data is checked for speed as shown at step 180 and if it is moving faster than the master transmission the clocks are slowed down as shown at step 182 before being converted to audio in sync with the transmission. On the other hand as shown at 184 if the slave program is running slower than the master, it is speeded up so as to maintain synchronization. Upon receiving the audio signal and beginning to transmit, the program moves to the outgoing data section as shown in FIG. 12 at 110B.

Figure 12:
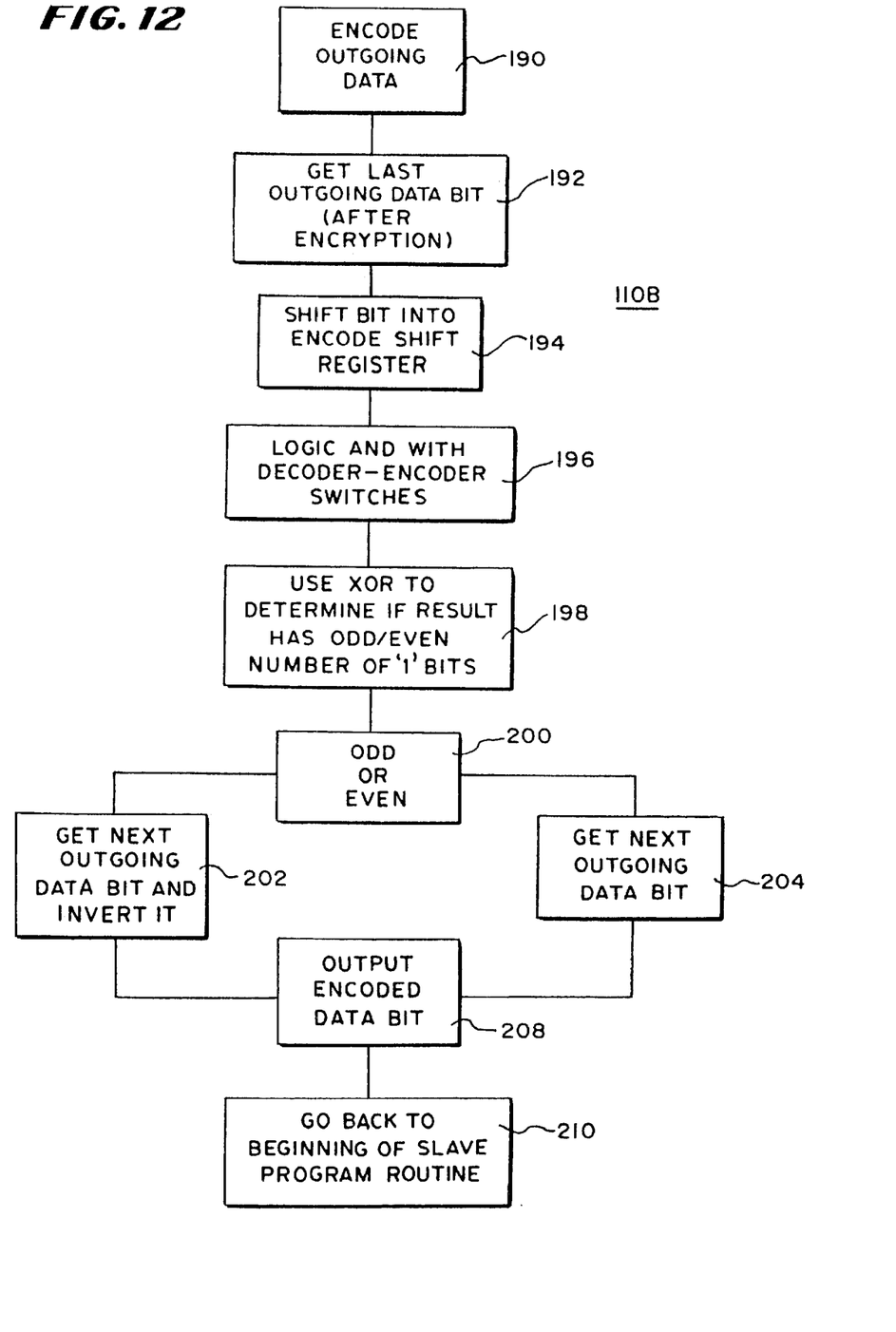
FIG. 12 is a more detailed block diagram of still another portion of the embodiment of FIG. 8.

In FIG. 12, the transmission of data by a slave transmitter is shown by the program steps 110B including the step 190 for encoding the audio signal generated by the microphone and proceeding to step 192 to obtain the last digital bit and shifting it into the encode shift register 194. The selected switches select stages as shown at step 196 for Exclusive-OReding to determine if the result has an odd or even number of binary one bits as shown in step 198. A decision is made as to whether its odd or even as shown at step 200 and if it is an odd number of bits the bits are inverted as shown at step 202. If even, they are transmitted on without inverting as shown at stage 204. The output is then transmitted as shown at step 208 and the program returns to the beginning of the slave program routine as shown at step 210.

From the above description, it can be understood that the synchronizing circuit and coded transmitter and receiver of this invention have several advantages such as: (1) they transmit the signal with high fidelity; (2) there is very little cross talk between several different transmitters using even slightly different encoding selections; and (3) the equipment is simple and inexpensive.

Although a preferred embodiment of the invention has been described with some particularlity, many modifications are possible without deviating from the invention. Therefore, it is to be understood that, within the scope of the appended claims, the invention can be practiced other than as specifically described.

What is claimed is:

1. A synchronizing circuit for transmitting data from a transmitter to a receiver comprising:

a receiver memory for storing multiple bit words;

a decoding circuit means for sensing coded signals representing data as multiple bit words and for transmitting the coded signals to a memory;

said decoding circuit communicating with said memory wherein the coded signals are decoded while the coded signals are in said memory;

clock means for generating clock pulses and transmitting them to one of said memory and said decoding circuit for synchronizing said one of said memory and said decoding circuit;

means for resetting said clock means;

said means for resetting said clock means including means for generating a timing signal in response to the multiple bit words and utilizing the timing signal to reset said clock means.

2. A circuit in accordance with claim 1 in which said clock means generates pulses at a frequency set to be identical to clock pulses in a transmitter.

3. A synchronizing circuit according to claim 1 in which said memory is a shift register and said means for generating a timing signal is connected to said decoding circuit to generate a timing signal upon said decoding circuit detecting the presence of encoded data in said memory.

4. A synchronizing circuit in accordance with claim 3 in which said means for generating a timing signal is electronically connected to said memory to control writing and reading into and from said memory.

5. A synchronizing unit in accordance with claim 3 in which said decoding circuit receives signals from said memory, alters said signals and applies them to the input of said memory.

6. A synchronizing circuit in accordance with claim 1 further including a decoder in said receiver for decoding said data; said decoder including a plurality of setable switches whereby a particular transmitter and receiver may be set to communicate only with each other.

7. A method of synchronizing at least a first circuit and a second circuit that are not wired together for transmitting data comprising the steps of:

transmitting a data stream formed of multiple bit words from the first circuit to the second circuit wherein the data stream is digital and transmitted at a preset clock rate;

sensing at least one of said multiple bit words in said data stream and generating a timing signal in response thereto; and utilizing said timing signal to reset an oscillator to provide clock pulses at said preset clock rate for synchronizing data flow in said second circuit as the data stream is decoded.

8. A receiver for asynchronous coded signals comprising:

a sensor for receiving a transmitted data stream formed of multiple bit words;

memory means for storing the data stream received by the sensor;

clock means in the receiver for synchronizing said data stream being received; and means for generating timing signals from multiple bit words and using the timing signals to set the clock means.

9. A receiver according to claim 7 in which the memory means is a shift register and the shift register shifts data through the clock means.

10. A receiver in accordance with claim 8 further including:

an analog-to-digital converter for receiving the transmitted data stream and converting the data stream to a digital signal.

11. A receiver in accordance with claim 10 in which the sensor includes a receiving circuit for receiving encoded radio signals, converting the radio signals to audio signals and providing the audio signals to the memory means as multiple-digit words.

12. A receiver in accordance with claim 11 further including a decoder connected to a shift register for receiving the data stream, a timing pulse generator for generating a timing signal, said pulse generator being electrically connected to said decoder.

13. A receiver according to claim 11 in which the memory means is a shift register and the clock means shifts data through the shift register.

14. A method of decoding transmitted signals comprising the steps of:

sensing a data stream composed of encoded digital words;

conducting the data stream into a memory means;

synchronizing the conducting of said data stream with clock pulses from an oscillator; and resetting said oscillator with said data stream upon sensing a digital word.

15. A method in accordance with claim 14 in which the step of resetting said oscillator includes the steps of decoding said digital word in a memory and generating a timing signal upon sensing a decoded word.

16. A method in accordance with claim 15 in which said timing signal is used to read out the decoded word and reset a clock.

17. A method in accordance with claim 14 in which the data stream is decoded as it enters a memory.

18. A method in accordance with claim 17 in which an altered version of the signals in the memory are combined with the signals written into the memory.

19. A transceiver system for transmitting a signal from a transmitter to a receiver that are not wired together comprising:

a transmitter for transmitting the signal as a digital stream;

a receiver for receiving the digital stream;

encoding circuit means in the transmitter for encoding the digital stream;

decoding circuit means in the receiver for decoding said digital stream;

first clock means in the transmitter for synchronizing said digital stream being transmitted; second clock means in the receiver for synchronizing said digital stream; said second clock means including means for receiving the digital stream and utilizing timing of at least one digit in said digital stream to reset its clock;

a memory in said transmitter; and a memory in said receiver;

said encoding circuit means being connected to receive an output from said memory in said transmitter and combine the output from said memory in said transmitter with said data stream being entered into said memory, wherein said digital stream is encoded.

20. A transceiver system in accordance with claim 19 further including:

an analog-to-digital converter for converting analog information into digital data for transmission to the receiver as a digital stream;

a digital-to-analog converter for receiving the digital data transmitted to the receiver as a digital stream and converting it to an analog signal.

21. Apparatus in accordance with claim 19 further including:

said encoding circuit means and decoding circuit means including a plurality of setable switches whereby a particular transmitter and receiver may be set to communicate only with each other.

22. Apparatus in accordance with claim 21 in which said encoding circuit means includes a shift register, said setable switches connecting selected ones of the outputs of said shift register to an exclusive OR circuit, the output of said exclusive OR circuit being connected to the transmitter and to the input of said shift register, one other input to said shift register being connected to the digital input signal.

23. A method for the transmission of audio comprising:
converting audio into an analog signal;
converting the analog signal into a digital stream;
transmitting the digital stream at a pre-determined clock rate;
encoding the digital stream;
transmitting the encoded digital stream;
receiving the encoded digital stream;
decoding the encoded digital stream to form a digital signal;
utilizing the timing of the encoded digital stream to reset a clock in the receiver;
synchronizing the received encoded digital stream with the clock during decoding; and
combining a version of the decoded digital stream with the encoded digital stream as part of the decoding of the encoded digital stream.

24. A method in accordance with claim 23 further including the steps of:
converting the digital signal into an analog signal;
converting the analog signal to an audio signal.

* * * * *